J. B. BEAM.
WHEEL TIRE.
APPLICATION FILED SEPT. 26, 1910.
1,012,186.
Patented Dec. 19, 1911.
2 SHEETS—SHEET 1.
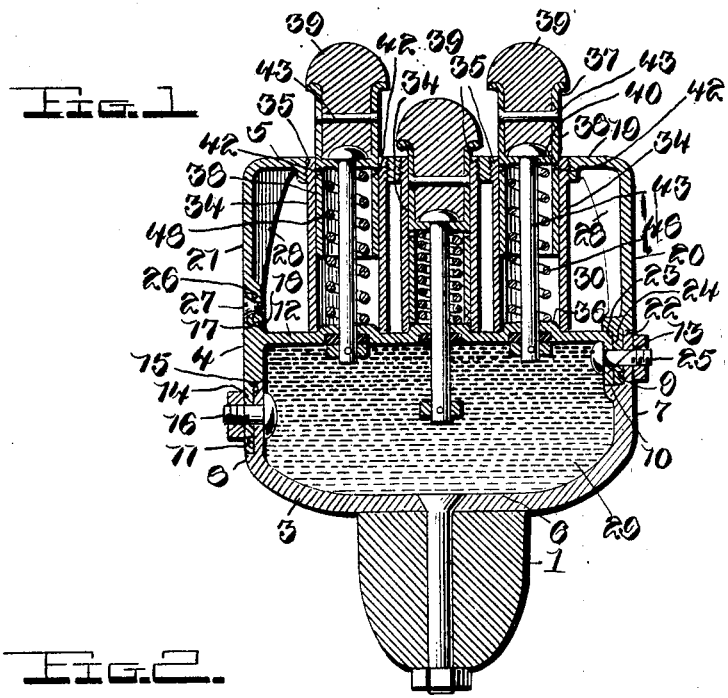
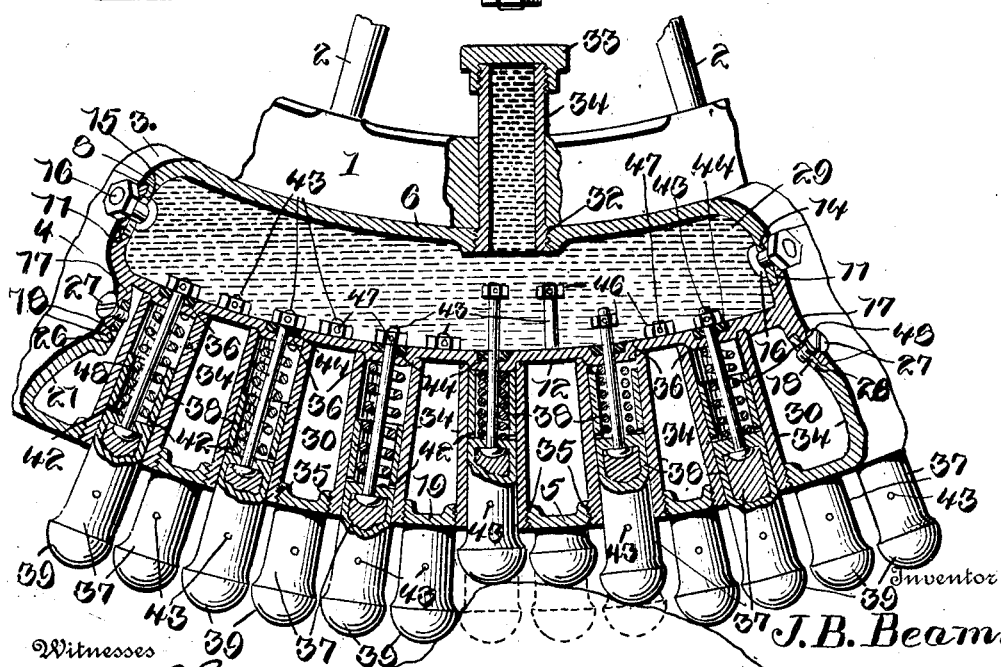

J. B. BEAM.
WHEEL TIRE.
APPLICATION FILED SEPT. 26, 1910.
1,012,186.
Patented Dec. 19, 1911
2 SHEETS—SHEET 2.
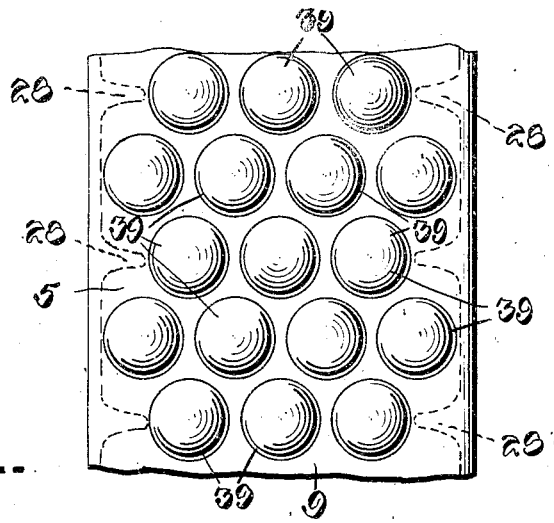
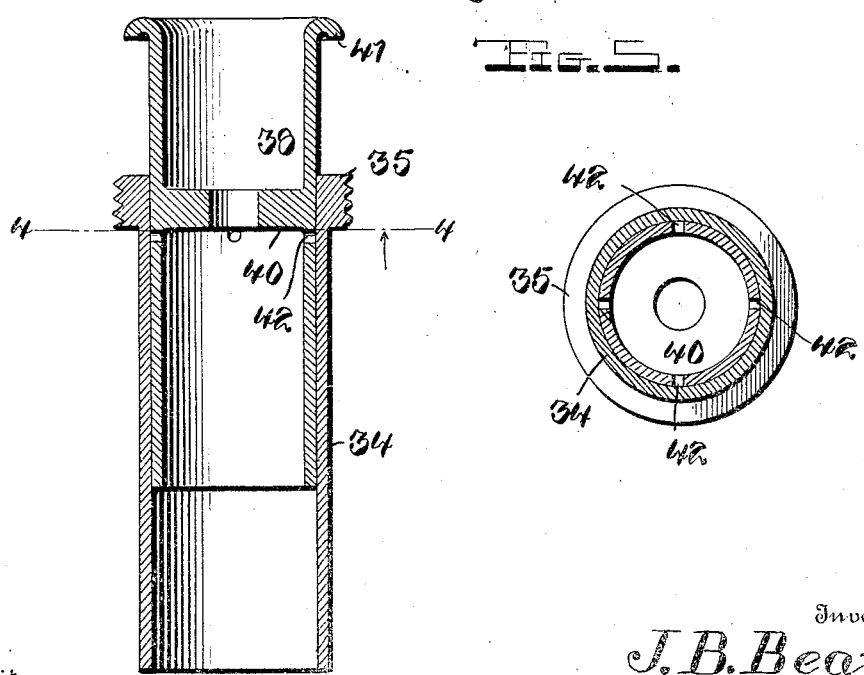
Witnesses
Chas. L. Griesbauer.
J. T. Queen.
Inventor
J. B. Beam.
By Watson E. Coleman
Attorney

UNITED STATES PATENT OFFICE.

JACOB B. BEAM, OF PUNXSUTAWNEY, PENNSYLVANIA

WHEEL-TIRE.

1,012,186. Specification of Letters Patent. Patented Dec. 19, 1911.

Application filed September 26, 1910. Serial No. 583,761.

*To all whom it may concern:*

Be it known that I, JACOB B. BEAM, a citizen of the United States, residing at Punxsutawney, in the county of Jefferson and State of Pennsylvania, have invented certain new and useful Improvements in Wheel-Tires, of which the following is a specification, reference being had to the accompanying drawings.

This invention relates to improvements in tires for use on the wheels of automobiles and other vehicles, the object of the invention being to provide an improved tire which is made of metal, in the construction of which no rubber or other similar expensive material is required, and which tire is provided with a series of radially movable spring pressed plungers which project from the tread of the tire, engage the surface on which the wheel rolls, and serve to cushion the wheel so as to cause the vehicle to run easily and smoothly and without jars and jolts.

A further object of the invention is to provide an improved automobile wheel tire which is not liable to be punctured.

A further object of the invention is to effect improvements in the construction of the tire whereby the springs which cushion the radially movable plungers are automatically lubricated.

A further object of the invention is to effect improvements in the construction of the tire whereby the assembling and disassembling of the parts thereof are greatly facilitated.

A further object of the invention is to effect improvements in the construction of the guide elements in which the radially movable plungers are seated.

A further object of the invention is to effect improvements in the construction of the plungers.

With the above and other objects in view my invention consists in the construction, combination and arrangement of devices hereinafter described and claimed.

In the accompanying drawings—Figure 1 is a transverse sectional view of a tire constructed in accordance with my invention. Fig. 2 is partly an elevation and partly a longitudinal sectional view of a portion of the same. Fig. 3 is a detail plan of the tread of my improved tire. Fig. 4 is a detail sectional view of one of the guide sleeves in which the radially movable plungers are mounted, and Fig. 5 is a detail transverse sectional view of the same on the plane indicated by the line 4—4 of Fig. 4.

For the purposes of this specification, a portion of the rim or felly of an automobile wheel is indicated at 1, some of the spokes being indicated at 2.

My improved tire which is made of suitable metal or other hard and durable material, comprises an inner annular section 3, an intermediate section 4, and an outer section 5. The inner section 3 is substantially U-shaped in transverse section, providing a bottom 6, the central portion of which bears on the periphery of the rim 1, and side walls 7, 8, a channel being formed between the said side walls. The wall 7 is higher than the wall 8 and is provided on its inner side at its outer edge with an annular recess 9, the base of which is formed by an annular shoulder 10 on the inner side of the said wall. The lower side wall 8 is provided on its outer side with an annular recess 11. The intermediate section or member 4 comprises a transverse annular web or base 12, provided at one side with an annular wall 13, to enter the recess 9 of the wall 7, and at the opposite side with an inwardly extending wall 14 to bear on the outer edge of the wall 8, and having a recess 15 on its inner side to receive the narrowed outer portion of said wall 8, so that the walls 8 and 14 are rabbeted together, the rabbet joint between then extending annularly around the tire on one side thereof. The said walls 8, 14 are detachably secured together by means of bolts 16. The said intermediate member 4 is also provided with an outwardly extending wall 17 which is in line with the wall 14, and is provided on its inner side with an annular rabbet 18.

The outer section or member 5 comprises a tread web 19, and inwardly extending walls 20, 21, at opposite sides thereof, the former higher than the latter. The said wall 20 is formed with rabbets 22, 23, on opposite sides, thereby providing a narrow portion or flange 24 to enter the rabbet 9 of the wall 7 and bear between the said wall 7, and the wall 13 of the member 4. Bolts 25 are disposed in alined openings with which the walls 7 and 13 and the flange 22 of the wall 20 are provided, and serve to secure the same together, the said bolts 25 in connection with the bolt 16 serving to detachably secure the member 4 to the inner member 3, and to also secure one side of the outer member 5 to the intermediate member 4, and the inner member 3. The wall 21 of the outer member 5 has a rabbet 26 in its outer side at its inner edge for the reception of the narrowed outer portion of the wall 17, of the intermediate member 4, so that a rabbeted or overlapping joint is formed between the member 4 and the member 5, screws or other suitable devices 27 being employed to detachably secure the walls 17 and 21 together. The member 5 is provided on the inner side walls and in the angles between its walls, and its tread web 19, with reinforcing ribs 28 which are radially disposed, and appropriately spaced apart, and serve to greatly strengthen the construction of the said outer member, especially at the points thereof which are subjected to the greatest stress.

It will be observed upon reference to Figs. 1 and 2 of the drawings that the inner, intermediate and outer annular members of my improved tire provide the said tire with an inner chamber 29 between the inner and intermediate members, and an outer chamber 30 between the intermediate and outer members. The inner chamber 29 is a reservoir chamber for the reception of a suitable lubricant or lubricating fluid, such as transmission grease. A filling nipple 31 is provided for the inner member 3 which is connected thereto by a screw joint as at 32, extends through the rim 1 of the wheel, and is provided at its inner end with a screw cap 33.

In the outer chamber 3 are arranged radially disposed cylindrical guide sleeves 34, each of which is open at its inner and outer ends, is provided at its outer end with a screw threaded head 35, engaged with a threaded opening in the tread web 19 of the outer tire member 5, the inner end of each guide sleeve being disposed around a boss 36, on the outer side of the intermediate member 4. Hence the said guide sleeves are firmly screwed in radial position in the outer chamber of my improved tire, extend to the tread or outer surface thereof, and are adapted to be readily removed therefrom when necessary.

Plungers 37 operate in the guide sleeves 34. The said plungers constitute tread elements for engagement with the road or other surface over which the wheel is passing, and are movable radially and are normally projected outwardly from the periphery of the tire formed by the tread web 19, of the member or section 5. Each plunger is here shown as comprising a tubular ferrule and guide member 38, and a head 39. The ferrule members 38 fit snugly and are movable longitudinally in the guide sleeves 34, and are made of steel, iron or other suitable material. Each of the said members 38 is provided at a point intermediate its ends with a web or diaphragm 40 which extends across the same. The outer end of each member 38 is also provided at a point within the web 40 with radial openings 42, which extend to the inner surface of the guide sleeves 34. The head 39 or tread member of each plunger is made of some suitable very durable and yet inexpensive material, and which is non-resonant, such for instance as fiber or wood. The outer portion of each head or tread member or each plunger is preferably semi-spherical as herein shown, and the inner portion thereof is cylindrical and fits in the chamber formed by the ferrule member 38 on the outer side of the web or diaphragm 40. The treads or head members of the plungers are secured in place in the outer portions of the guide ferrule by means of headed rivets or pins 43 which extend transversely therethrough, and also through opposite sides of the said members 38, as shown in Fig. 1. When one of the heads or tread members becomes worn or broken, it may be removed and another substituted in its stead, and hence the plungers may be, at very small expense, maintained indefinitely in operating condition. Each plunger includes a bolt 43 which operates in openings in the cross web or diaphragm of the ferrule member, and in the web of the intermediate member 4. A packing washer 44, made of fiber or any other suitable material is placed around each bolt and disposed in a recess 45 in the web of the intermediate member 4, and to the inner end of each bolt is attached a stop head 46 by means of a cotter pin 47. Coiled extensile springs 48 of suitable size and strength are employed to press the plungers outwardly. Each of these springs is disposed in one of the guide sleeves 34 with its inner end bearing on the boss 36, and its outer end in the guide ferrule, and bearing against the cross web or diaphragm 40 thereof.

It will be observed and understood that the springs which normally press the plungers outwardly, normally keep the stop heads bearing against the inner side of the packing washers in the outer side of the grease chamber 29.

The plungers are disposed in staggered relation, on diagonal lines, as shown in Fig. 3, so that they are closely associated, and it will be understood that as the wheel turns the load is placed upon the spring pressed plungers at the under side of the wheel. Ordinarily, a number of these plungers will sustain the weight of the load. In the event that the wheel encounters an inequality in the road surface, or passes over a stone or other obstruction, as indicated in Fig. 2, those of the plungers, which engage the stone or other obstruction will be forced inwardly against the tension of their springs to a greater extent than those which are engaging the comparatively smooth surface of the road. Hence the wheel adapts itself to the inequalities in the road surface, is cushioned at all points of its periphery, and rolls smoothly and evenly, and avoids jolting and jarring the body of the vehicle. As each plunger is moved inwardly under the load against the tension of its spring, the bolt forming an element of the plunger moves inwardly in the grease chamber 29 so that the surface of that portion of the bolt within the grease chamber becomes coated with the grease or other lubricant, and as the plunger moves outwardly some of the grease carried by the bolt passes therewith through the bolt opening in the web of the intermediate member 4 of the tire, and into the chamber formed in the guide sleeve of the said plunger, and hence the spring which operates the plunger also becomes coated with the lubricant and maintained in such a greasy condition as to prevent the spring from becoming rusted and impaired by such rust. Hence the life of the springs is indefinitely extended.

It will be understood that should any of the parts break or become worn, the same can be readily removed, and replaced by a new one, so that the wheel can be kept in operative condition for an indefinite period and at a very slight expense. Moreover, during a long run, should any one of the plungers or any element thereof become impaired and the plunger rendered inoperative, there would be no necessity for stopping and making repairs, as each of the plungers forms only one of the cushioning elements, and injury to one of them will not seriously impair the others in the vicinity thereof, and the operative plungers will continue to render the wheel effective and repairs can be postponed until the end of the run, or until convenient. Hence delays on the road and vexations and expense incident thereto, are avoided by my improved tire. It is obvious that since the members of the tire are made of steel, iron, or other strong and durable material, the same is not likely to become injured.

Owing to the fact that the wall 8 of the member 3, is not so high as the wall 7, said wall 8 clears the inturned wall 13 of the intermediate member 4, and the flange 24 of the outer member 5 and permits said intermediate member and outer member when secured together to be placed or removed from the inner member 3, as will be understood.

I claim—

1. A wheel tire, comprising an inner section containing a lubricant chamber, and an outer section mounted thereon, guide tubes in the outer section, spring pressed plungers in the guide tubes and rods connected with the plungers and extending radially into the lubricant chamber.

2. A wheel tire, comprising an inner section containing a lubricant chamber and an outer section mounted thereon, guide tubes in the outer section, radially arranged plungers projecting from the outer section, springs within the tubes for pressing the plungers radially outward, rods connected with the plungers and extending into the lubricant chamber, collars on the inner ends of the rods and soft washers on the wall of the lubricant chamber through which the rods extend and against which the collars on the rods abut.

3. In a wheel tire, a lubricant chamber, comprising an inner member having annular outwardly extending side walls of unequal lengths, and an outer member having inwardly extending side walls of unequal lengths, the longer of which joins the outside of the shorter side wall of the inner member while the shorter wall of the outer member joins the inside of the longer wall of the inner member, devices for detachably connecting the members together, a series of radially movable spring pressed plungers mounted on the outside of the lubricant chamber, and rods attached to the plungers and extending into the lubricant chamber.

4. In a wheel tire, the combination with the rim, of an inner section attached thereto having outwardly extending flanges of unequal lengths, an intermediate section having inwardly extending flanges of unequal lengths, the shorter flange of the intermediate section joining the longer flange of the inner section and the longer flange of the intermediate section joining the shorter flange of the inner section, an outer section having flanges of unequal lengths, the longer flange being joined to the longer flange of the inner section and the shorter flange being joined to an upwardly extending flange of the intermediate section, devices for detachably connecting the flanges, guide tubes carried by the outer section, spring pressed plungers arranged in the outer section and rods connected with the plungers and adapted to move radially therewith.

5. A hollow wheel tire of the class described, having an outer annular chamber, an inner annular chamber, and an annular wall separating the said chambers, means to supply the inner chamber with fluid lubricant, guide sleeves in the outer chamber disposed radially with respect to the tire, open at their outer ends at the periphery of the tire, plungers movable in said sleeves, springs to project said plungers, and bolts connected to said plungers, movable therewith, extending through openings in said web, and having their inner portions disposed and operating in the said inner chamber of the said tire.

6. A hollow wheel tire of the class described, having an outer annular chamber, an inner annular chamber, and an annular wall separating the said chambers, means to supply the inner chamber with lubricant, guide sleeves in the outer chamber, disposed radially with respect to the tire, open at their outer ends at the periphery of the tire, plungers movable in said sleeves and each comprising a ferrule and a head member therein, springs in said sleeves, and recessed in said ferrules to project said plungers, and bolts connected to the ferrules of said plungers, movable therewith, extending through openings in said web, and having their inner portions disposed and operating in the said inner chamber of the said tire, said bolts having stop devices on their inner ends coacting with said web to limit the outward movement of said plungers.

7. A hollow wheel tire having inner and outer annular chambers, a transverse partition web dividing said chambers, radially disposed guide sleeves detachably secured to the periphery of said tire, and extending through said outer chamber, radially movable plungers in the said guide sleeves, springs to project said plungers, and radially movable stops connected to said plungers, and coacting with the said web to limit the outward movement of said plungers.

8. A hollow wheel tire of the class described having inner and outer annular chambers, and a transverse partition web separating the said chambers, said partition web having bosses on its outer side, and provided with openings at the centers of said bosses, guide sleeves in the said outer chamber connected at their outer ends to the periphery of the tire, and having their inner ends disposed around the said bosses, plungers in the said guide sleeves, and having members extending through and operating in the openings in said web, said members having stop devices to limit the outward movement of said plungers, and springs in said guide sleeves bearing between said plungers and the said bosses, and serving to project the said plungers.

9. A hollow wheel tire having inner and outer annular chambers and comprising an inner annular member hollowed in its outer side, an intermediate annular member extending across the hollow outer side of the inner member and having side walls which are secured to those of said inner member, and an outer annular member hollowed on its inner side and having side walls secured to the said intermediate annular member, and spring pressed radially movable plungers mounted on the outer member and having rods extending through the outer and intermediate members.

10. A hollow wheel tire having inner and outer annular chambers, and comprising an inner annular member, an intermediate annular member, and an outer annular member, and means to detachably secure said annular members together, said annular members having overlapping side walls engaged by the said securing means, the said walls of the inner and intermediate members being of unequal height, and adapting the intermediate and outer members to be detached by transverse movement from said inner member and spring pressed radially movable plungers mounted on the outer member and having rods extending through the outer and intermediate members.

11. The combination with the rim of a wheel, of a tire attached to the periphery thereof, comprising a lubricant chamber, guide tubes attached to the outside thereof, radially movable plungers operating in said guide tubes, springs in the plungers for pressing them radially outward, and rods connected with the plungers and adapted to move into the lubricant chamber.

In testimony whereof I hereunto affix my signature in the presence of two witnesses.

JACOB B. BEAM.

Witnesses:
J. W. GARNER,
GEO. S. LIVINGSTON.